H. H. NEALE.
SPRING SUSPENSION OF SELF PROPELLED VEHICLES.
APPLICATION FILED AUG. 19, 1919.

1,389,839.

Patented Sept. 6, 1921.

Inventor
Herbert H. Neale
By his Attorney

UNITED STATES PATENT OFFICE.

HERBERT H. NEALE, OF NEW YORK, N. Y.

SPRING SUSPENSION OF SELF-PROPELLED VEHICLES.

1,389,839. Specification of Letters Patent. Patented Sept. 6, 1921.

Original application filed October 6, 1916, Serial No. 124,036. Divided and this application filed August 19, 1919. Serial No. 318,451.

*To all whom it may concern:*

Be it known that I, HERBERT H. NEALE, a citizen of the United States of America, residing in New York, N. Y., U. S. A., have invented certain new and useful Improvements in Spring Suspensions of Self-Propelled Vehicles, of which the following is a specification.

My invention relates to a cantaliver spring suspension for self-propelled vehicles. The objects of my invention are to secure improved riding and road-shock absorbing qualities, and more particularly to reduce the rebound, side-sway, and lurching when passing over rough roads.

The present application is a division of my prior application Serial No. 124,036, filed October 6, 1916. In the prior application I have disclosed more broadly a suspension comprising a substantially rigid cradle carried by the vehicle axle and a laminated spring or springs connected at the free ends to the ends of the cradle and at the thick mid-portion or portions to the frame. In the present instance, each spring or spring portion has the form of a cantaliver and only one end thereof is attached to the cradle, the other end and the thick portion thereof is fixed to the vehicle frame. A plurality of such springs may be, and preferably are, mounted and combined in the manner hereinafter described.

Figure 1:
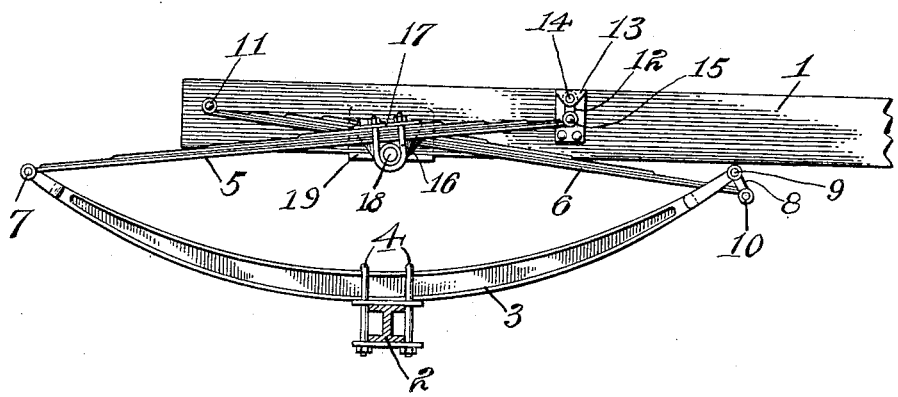
Figure 2:
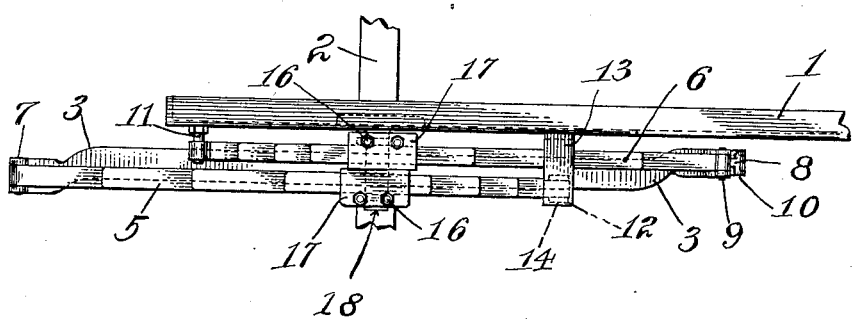

In the drawings forming a part hereof, I have illustrated the best embodiment of my invention of which I am now aware; Figure 1 is a side elevation of the suspension at one corner of the vehicle; and Fig. 2 is a plan thereof.

In the drawing, 1 indicates the frame of the motor driven, self-propelled vehicle, 2 an axle thereof, and 3 the substantially rigid cradle united by clips 4 at its center to the axle; the cradle 3 is disposed at right angles to the axle as illustrated. The cradle may be of any suitable outline in cross section, and may be of the same construction as the side members of the frame or any other construction; for example, both may be of wrought channels. The ends of the cradle 3 are preferably extended upwardly at both sides of the axle as shown, and in the present instance are offset in opposite directions as is shown in Fig. 2 for purposes which later appear; the cradle may however be of any shape suitable for carrying the springs in the general manner later described herein.

Two laminated cantaliver springs 5 and 6 are connected to the single cradle 3. Each spring is built up of leaves of graduated lengths, the thickest part of the spring being however nearer one end of the spring than the other. The springs are connected at their longer free ends, that is, those ends more remote from their thickest sections or bases to the opposite ends of the cradle, for example, either directly by a bolt 7 or by a shackle 8 and bolts 9 and 10. The opposite thin ends of the springs are anchored to the frame member 1 in any suitable manner, for example, by a bracket bolt 11 or by a shackle 12 and bracket 13 and bolts 14 and 15. Preferably the two springs are disposed in parallel vertical planes and the cradle ends are offset, as before mentioned, to allow this disposition; the springs preferably cross each other adjacent their intermediate thick portions or bases and are fulcrumed thereat. It will be understood however that while this is the preferred arrangement, my invention is not limited to this arrangement except as hereinafter indicated. Yoke clips 16 and plates 17 in the device illustrated, embrace the laminations at the thickest part of the springs and fasten the springs to the common stud 18 projecting from the fitting 19 on the frame.

In contrast with horse drawn vehicles, motor driven vehicles, it will be remembered, are subject to unusually numerous and particularly severe shocks due to their nature and mode of operation. The spring suspension of my invention is particularly adapted for such conditions. The shocks and jars of the wheel and axle, are initially transmitted to the more flexible parts of the suspension, namely the ends of the springs as is apparent; here they are more quickly absorbed, and the shocks and jars are transmitted to the chassis which is carried on the thicker sections of the springs, to a much smaller degree than heretofore.

While the above described embodiment is the best embodiment of my invention of which I am aware, it will be understood that this embodiment is merely illustrative of my invention which is not limited thereto. My invention which I desire to secure by Letters Patent is set forth in the following claims.

Claims:

1. A spring suspension for motor vehicles consisting of a substantially rigid cradle supported by the vehicle axle at right angles thereto, and double cantaliver springs, each cantaliver being connected by its free end to one of the ends of said cradle and secured at its base and opposite end to the frame of the vehicle.

2. In a motor vehicle and in combination with the frame and an axle thereof, a relatively rigid cradle united centrally and at right angles to the axle, and two crossed cantaliver laminated springs connected at their free ends to the opposite ends of the cradle and at their opposite ends to the frame.

3. In a motor vehicle having a frame and an axle, a suspension comprising a relatively rigid cradle united centrally and at right angles to the axle, two laminated cantaliver springs connected at their free ends to the opposite ends of the cradle and at their opposite ends to the frame, and a common mounting on the frame for the intermediate portions of the springs.

In testimony whereof, I have signed this specification.

HERBERT H. NEALE.